United States Patent [19]
Morris et al.

[11] 3,810,452
[45] May 14, 1974

[54] ENGINE SPARK TIMING SYSTEM CONTROL

[75] Inventors: Thomas H. Morris, Southgate; Tao-Yuan Wu, Ann Arbor, both of Mich.

[73] Assignee: Ford Motor Company, Dearborn, Mich.

[22] Filed: Mar. 8, 1972

[21] Appl. No.: 232,808

[52] U.S. Cl............................................ 123/117 A
[51] Int. Cl............................................... F02p 5/04
[58] Field of Search..................... 123/117 A, 117 R

[56] References Cited
UNITED STATES PATENTS

| | | |
|---|---|---|
| 2,698,612 | 1/1955 | Schaefer ......................... 123/117 A |
| 3,596,644 | 8/1971 | Hutchins.......................... 123/117 A |
| 3,521,610 | 7/1970 | Coudriet.......................... 123/117 A |

*Primary Examiner*—Laurence M. Goodridge

[57] ABSTRACT

An engine spark timing control system includes a distributor servo actuator that normally advances the engine timing as a function of carburetor spark port vacuum changes, and retards the spark by means of a spring during acceleration and deceleration modes of operation; and additionally includes a control to temporarily advance the spark timing setting during acceleration modes of operation, with a built-in means to automatically return the spark timing setting to a level normally called for by the spark port vacuum after a predetermined adjustable time delay.

23 Claims, 4 Drawing Figures

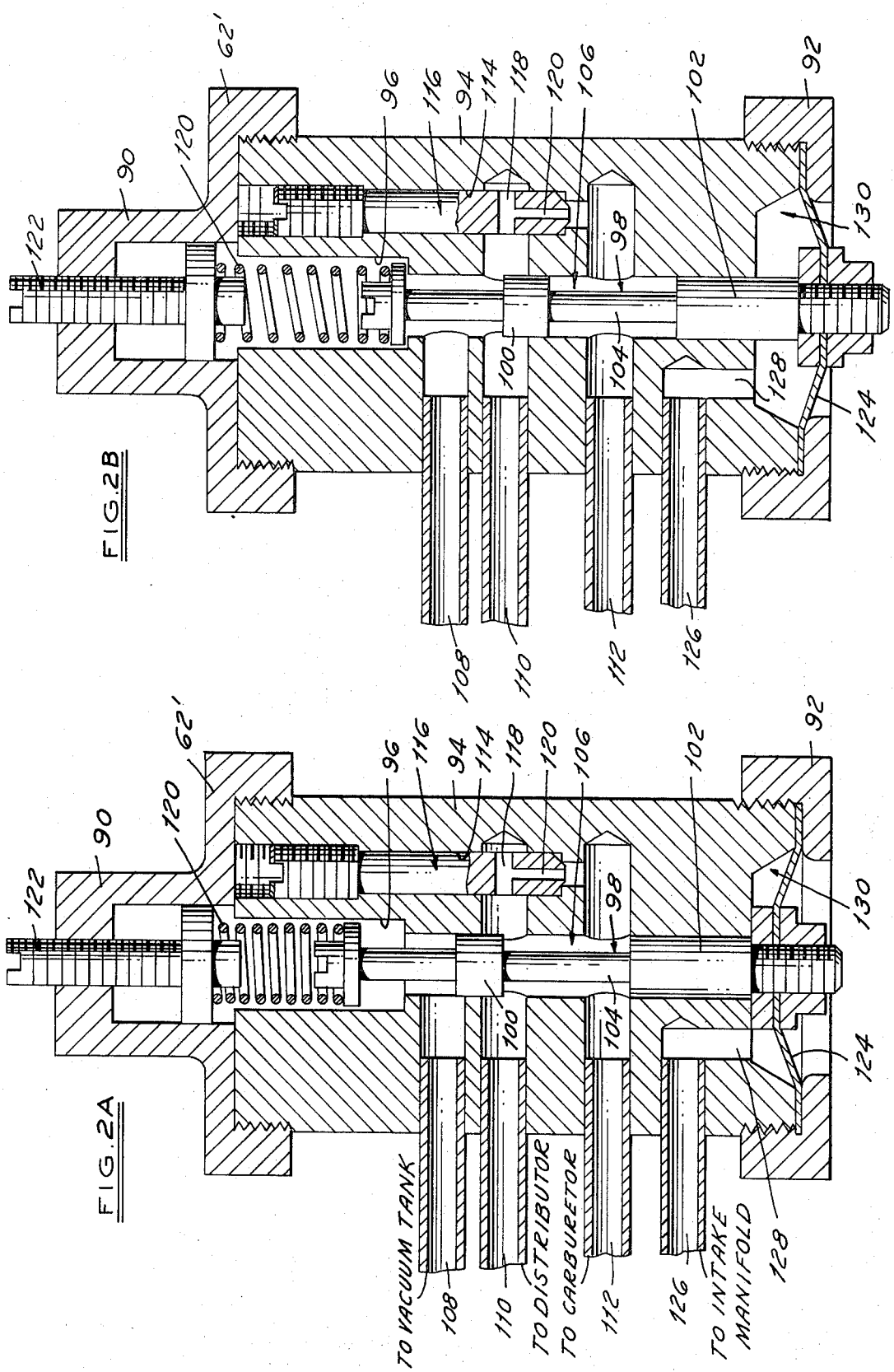

ENGINE SPARK TIMING SYSTEM CONTROL

This invention relates, in general, to an engine spark timing system control. More particularly, it relates to one in which the ignition timing is temporarily advanced during accelerative modes of operation of the engine, instead of normally being retarded, as generally would be the case as called for by the level of spark port vacuum.

The lowering of compression ratios to permit use of low lead fuel in present day engines will lengthen the total combustion time. One of the reasons is that now the burn rate of the fuel/air mixture is slower. Other factors that will influence the combustion time are the recirculation of exhaust gases into the combustion chamber to decrease emissions, which have the effect of diluting the incoming charge. At high engine rpms, for example, the slow burning may lengthen the combustion period not only through the power stroke of the engine but actually into a portion of the intake stroke before complete combustion is obtained. In such an instance, with wide valve overlap, the burning charge then can pass directly through the intake valve into the intake manifold and ignite the incoming charge. The resulting engine backfire provides a pressure pulsation wave that may pass back through the carburetor. This is undesirable.

Accordingly, it is a primary object of the invention to temporarily advance the engine ignition timing during accelerative modes of operation to effect earlier ignition of the fuel/air mixture to provide combustion in a manner that will avoid the backfire problem described above.

It is another object of the invention to provide an engine spark timing control that advances the ignition timing to a setting above that normally called for by the level of spark port vacuum in the carburetor, for a period of time sufficient to avoid backfiring, at the end of which the timing will return to the setting called for by the level of vacuum at the carburetor spark port.

It is a still further object of the invention to provide an engine spark timing control including a conduit normally connecting the spark port vacuum to the distributor servo actuator to normally advance the timing as a function of spark port vacuum changes; the control also including a valve that is operable in response to accelerative modes of operation of the engine to disconnect spark port vacuum from the servo means except for a predetermined bleed passage therebetween while connecting a separate source of vacuum to the distributor servo actuator that will temporarily advance the ignition timing setting to a level above that normally called for by spark port vacuum; the restricter controlling the length of time the temporary advance is effected by controlling the bleed of the supplemental vacuum to the spark port pressure level.

Another object of the invention is to provide an engine spark timing control that is mechanically linked to the carburetor throttle valve so that above a predetermined opening, the engine ignition timing will automatically be advanced to a level above that normally called for at the time, the higher than normal setting lasting for a time controlled by a time delay device.

Another object of the invention is to provide an engine spark timing control as described above in which the movement of the throttle valve triggers an electrical control system to actuate a valve to connect a vacuum reservoir to the engine ignition timing distributor servo to effect the higher than normal advance and continue the same until reservoir vacuum is bled to spark port pressure level.

A still further object of the invention is to provide an engine spark timing control system as described above in which movement of the throttle valve to a predetermined position rotates a valve which in rotating progressively decreases the supply of spark port vacuum to the engine distributor servo actuator; while at the same time progressively increasing the amount of vacuum from a reservoir to the servo actuator to advance the ignition timing above its normal setting for a time period that will avoid engine backfiring by initiating engine combustion earlier than with conventional spark timing control systems.

Other objects, features and advantages of the invention will become more apparent upon reference to the succeeding detailed description thereof, and to the drawings illustrating the preferred embodiments thereof, wherein;

FIGS. 2a and 2b are enlarged cross-sectional views of a modification of a detail of FIG. 1, and showing in different operative positions; and, FIG. 3 is a cross-sectional view of a further modification of a detail of FIG. 1.

Figure 1:
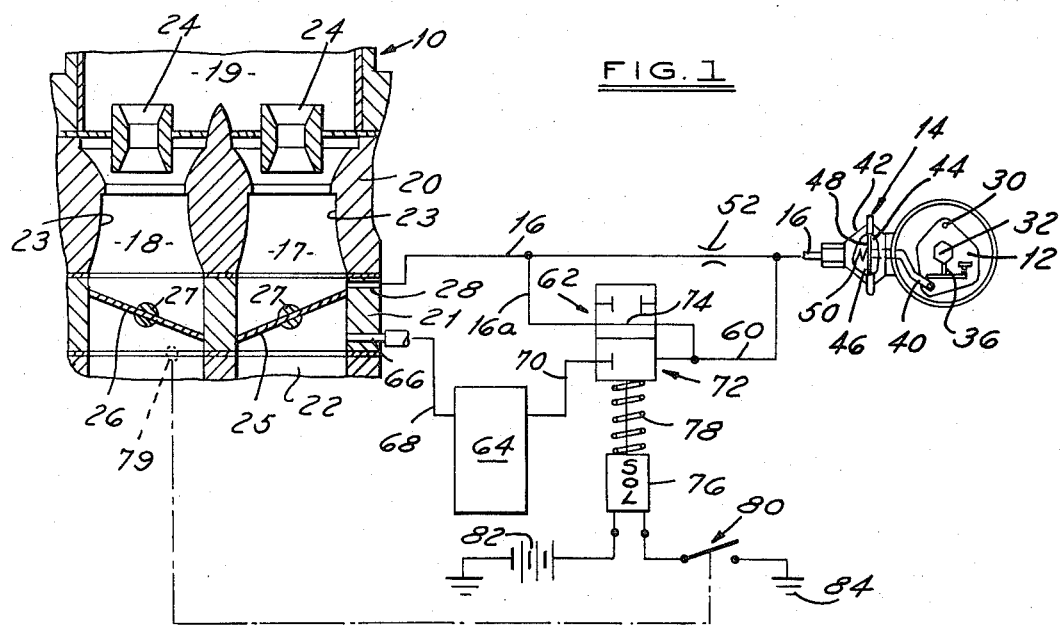
FIG. 1 illustrates schematically an engine spark timing control system embodying the invention.

FIG. 1 shows, schematically, only those portions of an internal combustion engine that are normally associated with the engine spark timing system control; such as, for example, a carburetor 10, a distributor breaker plate 12, a vacuum servo 14 to control the movement of breaker plate 12, and a line 16 between the carburetor and vacuum servo to normally automaticaly change the engine spark timing setting as a function of changes in carburetor vacuum spark port setting.

More specifically, carburetor 10 is shown as being of the downdraft, four-barrel (only two barrels shown) type having the usual primary and secondary air induction passages 17 and 18. Included is an upper air horn section 19, an intermediate main body portion 20, and a throttle valve flange section 21. The three carburetor sections are secured together by suitable means, not shown, over an intake manifold indicated partially at 22 leading to the engine combustion chambers.

Main body portion 20 contains the usual air/fuel mixture induction passages having fresh air intakes at the air horn ends, and connected to manifold 22 at the opposite ends. The passages are each formed with a main venturi section 23 containing a booster venturi 24 suitably mounted for cooperation therewith, by means not shown.

Flow of fuel and air through passages 17, 18 is controlled by conventional primary and secondary throttle valves 25, 26 fixed to a shaft 27 rotatably mounted in flange portion 21. The throttle valves are rotated in a known manner by depression of the vehicle accelerator pedal, and moved from an idle speed position shown essentially blocking flow through passages 17, 18 to a wide open position essentially at right angles to the positions shown. Fuel would be inducted in the usual manner from the small venturis 24 in a known manner.

A spark port 28 is provided at a point just above the idle position of throttle valve 25, to be traversed by the throttle valve during its opening part throttle movements. This will change the vacuum level in spark port 28 as a function of the rotative position of the throttle valve, the spark port reflecting essentially atmospheric pressure in the air inlet upon closure of the throttle valve.

As stated previously, the distributor includes a breaker plate 12 that is pivotably mounted at 30 on a stationary portion of the distributor and movable with respect to cam 32. The latter has six peaks corresponding to the number of engine cylinders. Each peak cooperates with the follower 36 of a breaker point set 38 to make and break the spark connection in a known manner for each one-sixth, in this case, rotation of cam 32. Pivotal movement of breaker plate 12 in a counterclockwise spark retard setting direction, or in a clockwise spark advance setting, is provided by an actuator 40 slidably extending from vacuum servo 14.

Servo 14 may be of a conventional construction. It has a hollow housing 42 whose interior is divided into an atomspheric pressure chamber 44 and a vacuum chamber 46 by an annular flexible diaphragm 48. The diaphragm is fixedly secured to actuator 40, and is biased in a righward retard direction by a compression spring 50. Chamber 44 has an atmospheric or ambient pressure vent, not shown, while chamber 46 is connected to line 16. Line 16, in turn, contains a flow restricting orifice 52 that delays communication of change of the pressure level between the spark port 28 and servo chamber 46 in a manner that will become clear later.

During engine-off and other operating conditions to be described, atmospheric pressure exists on both sides of the diaphragm 48, permitting spring 50 to force the actuator 40 to the lowest spark timing advance or a retard setting position. Application of vacuum to chamber 46 moves diaphragm 48 and actuator 40 toward the left to an engine spark timing advance position, by degree, as a function of a change in vacuum level.

Turning now to the invention, spark port vacuum is adapted to be connected to servo chamber 46 through an alternate conduit or line 60 bypassing the flow restricting orifice 52. Line 60 is controlled by a valve 62 that in an alternate down position blocks the line 16a from the spark port through the valve while connecting vacuum in a reservoir or accumulator 64 to the servo actuator chamber 46.

More specifically, the carburetor induction passage 17 contains a manifold vacuum port 66 located below the closed position of the throttle valve 25 so as to be sensitive to manifold vacuum changes at all times. The port is connected by line 68 to the vacuum reservoir or accumulator 64 in turn connected by line 70 to the valve structure 62. The latter contains a slidable valve 72 that is shown schematically and has a through port 74 and a number of blocked passages as indicated. The valve 72 is connected to the armature of a solenoid 76, and is normally biased to the position shown by a spring 78. Energization of the solenoid 76 will draw the valve downwardly to connect the through port 74 to the vacuum tank 64 and line 60, while blocking the spark port vacuum line 16a.

In this instance, the solenoid 76 is adapted to be energized when the secondary throttle valve 26 opens to a position indicative of heavy load or near wide open throttle operating conditions. That is, when the secondary throttle valve has moved, for example, 10° open, it engages a contact 79 that will effect closure of a switch 80 in an electrical circuit to solenoid 76 between a battery 82, for example, and a ground connection 84. It will be clear, of course, that the determination of the time when the solenoid is actuated will be a matter of choice and depend upon the particular circumstances during which this operation is desired. In this instance, the solenoid is energized when the throttle valve indicates that acceleration is occurring.

In operation, with the engine running and the throttle valves in idle speed closed positions shown, solenoid 76 remains de-energized and the valve 62 is located in the position shown connecting spark port pressure level directly to the servo chamber 46 through line 16a bypassing the orifice 52. Accordingly, spring 50 will stroke the actuator 40 to condition the engine timing for a maximum retarded or lowest advance setting. Subsequent opening of the throttle valves for light vehicle accelerations will subject the spark port to the manifold vacuum in increasing amounts and slowly advance the ignition timing by drawing the diaphragm 48 to the left progressively. This is a conventional operation. Movement of the throttle valve to a closed position indicating engine decelerating operation again will subject the servo chamber 46 to essentially atmospheric pressure from the spark port and move the servo diaphragm 48 to set the timing for a maximum retard operation.

Assume now that the throttle valves are moved rather suddenly open indicative of heavy demand for power by the vehicle operator. If the throttle valves are moved to a point where the secondary throttle valve engages the contact 79, the switch 80 will close and solenoid 76 will become energized and draw the valve 62 downwardly. This will immediately disconnect the servo actuator from the spark port pressure, except through line 16 and the bleed orifice 52, and connect chamber 46 immediately to the vacuum reservoir or accumulator 64. Accordingly, the higher vacuum in the reservoir will immediately advance the ignition timing to a setting above that normally called for by the level of the spark port vacuum. This will initiate combustion earlier than would normally occur and minimize backfiring by shortening the combustion period and thereby lessening the likelihood of ignition of any mixture in the intake manifold.

The higher than normal advance will begin to decay immediately by virtue of the orifice 52 communicating or bleeding the vacuum from the reservoir to the higher pressure level at the spark port. After a period of a few seconds, for example, the vacuum in chamber 46 will be at the same level as that at spark port 28. Actual period of delay, of course, will depend upon the size of the orifice 52 and also the level of the vacuum in the reservoir at the time of the connection of the reservoir to the servo chamber 46. If the acceleration occurs after an engine deceleration, the vacuum tank level may be quite high.

Whereas FIG. 1 indicates an electrical control operated in response to a predetermined movement of the throttle valve, FIGS. 2a and 2b show a modification in which the valve 62 of FIG. 1 is operated in response to changes in intake manifold vacuum level. More particularly, the valve 62 of FIG. 1 is replaced by a valve body 62' having upper and lower caps 90 and 92 threadedly engaging a main body portion 94. The latter has a central valve bore 96 in which is slidably mounted a spool type valve 98. It has a pair of spaced lands 100 and 102 interconnected by a neck portion 104 of reduced diameter. The latter forms an annular flow chamber 106.

The valve 98 controls the communication of spark port vacuum or vacuum from the reservoir or tank to the distributor. For this purpose, the valve body is provided with three passages intersecting the valve bore, passage 108 being connected to the vacuum reservoir or tank 64 shown in FIG. 1, the passage 110 being connected to servo chamber 46, passage 112 being connected to the carburetor spark port passage 28. The passages 110 and 112 are further interconnected by a valve body passage 114 bypassing the valve around the backside thereof. The latter passage is controlled by a second valve 116 having a T-shaped passage 118. The lower portion 120 of passage 118 constitutes a flow restricting orifice comparable to the orifice 52 shown in FIG. 1.

The main valve 98 is biased downwardly to the position shown in FIG. 2b by a spring 120 located in the upper portion of the valve body. The spring is adapted to be adjusted insofar as preload is concerned by a screw type device 122 indicated. The lower end of valve 98 is secured to an annular flexible diaphragm 124 adapted to be acted upon by intake manifold vacuum in a passage 126 connected thereto by an intersecting passage 128. Intake manifold vacuum of a level above the force of spring 120 will move the valve to its upward position shown in FIG. 2a interconnecting the carburetor spark port line 112 to the servo chamber 46 line 110 directly, and also, of course, by way of the restriction 120. This corresponds to the first position of the valve 62 shown in FIG. 1.

When the throttle valves 25, 26 are opened rapidly, indicating heavy accelerative operation, the immediate decay in engine intake manifold vacuum will be reflected in the chamber 130 around the base of the valve 98 so that the spring 120 can now move the valve downwardly to the position shown in FIG. 2b. This will immediately advance the engine ignition timing above a setting that would normally be obtained with a conventional construction by directly connecting the vacuum in tank 64 through line 108 to the servo actuator chamber 46 through line 110, while at the same time permitting a bleed of the vacuum tank level through the restriction 118 to the carburetor spark port pressure level.

Accordingly, the higher than normal spark timing setting will decay progressively until the level of vacuum in the tank 64 communicating with the spark port through the restricter 120 equals the rising spark port vacuum. At this point, therefore, the engine spark timing setting will be returned to the level that would normally be obtained with a conventional construction. At this point, the danger of backfire previously described will have been eliminated.

It will be noted, of course, that with the construction shown in FIGS. 2a and 2b, movement of the valve upwardly or downwardly can be made progressive as a function of changes in manifold vacuum level acting on the end of the valve. Therefore, it will be seen that the proportion of spark port vacuum and vacuum reservoir vacuum communicated to the servo chamber 46 can be in a variable manner.

Figure 3:
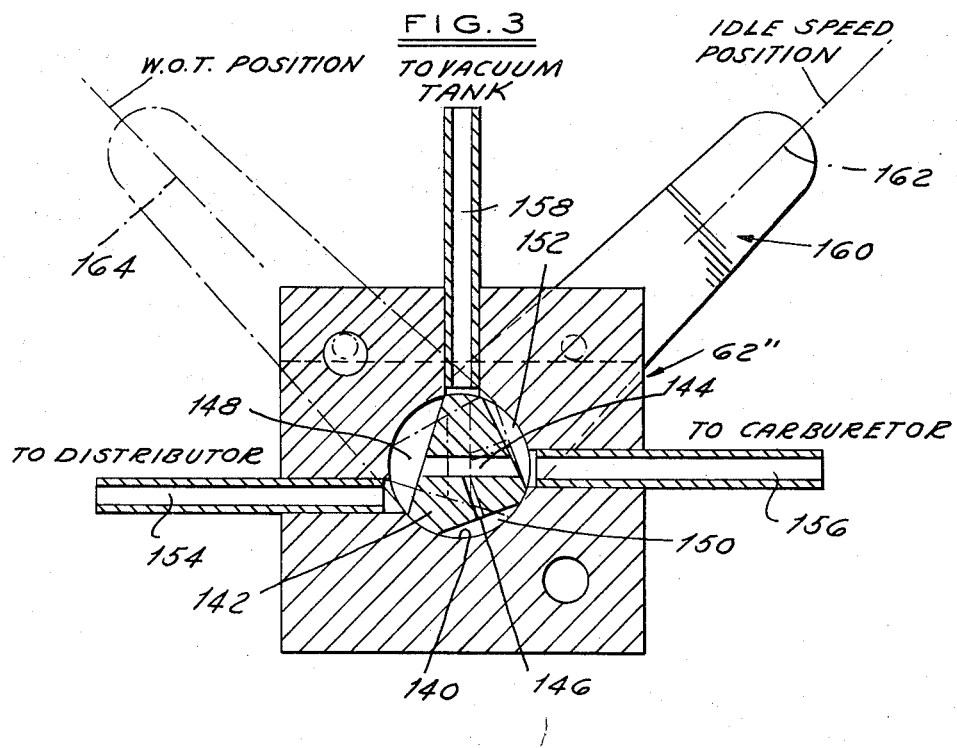

FIG. 3 shows a further modification of the invention. In this instance, in a manner similar to that described in connection with the FIG. 1 showing, the control is adapted to be actuated upon the attainment of a predetermined position of the throttle valve. More specifically, the control 62" includes a valve body having a central cylindrical bore 140 in which is rotatably mounted an essentially triangularly shaped valve member 142. The latter contains a central essentially large through passage 144 intersected by a flow restricting passage 146 constituting an orifice. This again corresponds essentially to the construction shown in FIGS. 1 and 2 with respect to the free and restricted passages 16 and 16 a therein.

The triangularly shaped valve provides three valve chambers 148, 150 and 152 that are adapted to selectively cooperate with passages 154, 156 and 158. Passage 154 again is connected to the servo chamber 46, passage 156 being connected to the carburetor spark port, and passage 158 being connected to the vacuum reservoir or tank 64.

The rotatable valve 142 is fixed to a lever 160 that is fixedly secured, by means not shown, for rotation with the throttle valve. Accordingly, it will be seen that when the throttle valve lever 160 moves from the idle speed position 162 of the throttle valve to the wide open throttle position 164, the valve will have rotated essentially 90° and made the desired connection to temporarily advance the ignition timing by connecting vacuum tank vacuum to the servo chamber 46. Again, the restricter 146 will slowly bleed the tank vacuum until it reaches a level equivalent to that of the spark port vacuum. Temporary advance will then have been terminated.

It is to be noted that the alternate connections again are made in a variable manner and proportionately so that a progressive advance or retard will be accomplished.

The overall operation of the invention is believed to be clear from the above description and a consideration of the drawings, and, therefore will not be repeated. It will be seen, therefore, that the invention provides a relatively simple means of avoiding engine backfire during engine accelerations by temporarily advancing the ignition timing until the danger of backfiring is terminated, at which time the engine timing is returned to a conventional setting determined in accordance with changes in engine spark port vacuum.

While the invention has been described and shown in its preferred embodiments, it will be clear to those skilled in the arts to which it pertains that many changes and modifications may be made thereto without departing from the scope of the invention.

We claim:

1. A spark timing control for an engine having a carburetor induction passage with a spark port above the idle speed position of the throttle valve, a distributor breaker plate spring biased in a spark timing retarded setting direction, vacuum servo means normally moving the breaker plate in an advanced timing direction as a function of increases in spark port vacuum applied thereto, conduit means connecting the spark port to the servo means, and control means operative during predetermined accelerative modes of operation of the engine momentarily delaying a decay in the level of the vacuum at the servo means to the lower level of vacuum provided immediately at the spark port in response to the predetermined accelerative modes of operation of the engine and then subsequently decaying the servo means vacuum to the timing level providing the spark timing setting called for by the spark port pressure level, the control means including a vacuum reservoir normally disconnected from the servo but connected thereto in response to the predetermined accelerative modes of operation of the engine.

2. A spark timing control as in claim 1, the control means including flow restricting means bypassing the conduit means for at times delaying communication of changes in pressure levels between the spark port and servo means.

3. A spark timing control as in claim 2, including a second conduit means connected between the vacuum reservoir and the servo means, and valve means between the conduit means movable to alternately connect the servo means to the first and second conduit means.

4. A spark timing control as in claim 3, including means connecting the vacuum reservoir to engine manifold vacuum so as to be subject to the changes therein.

5. A spark timing control as in claim 3, including means responsive to opening movement of the throttle valve beyond a predetermined amount for moving the valve to a position connecting the vacuum reservoir to the servo means.

6. A spark timing control as in claim 3, including means to move the valve means in a variable manner so as to proportionally connect the servo means to the first and second conduit means as a function of the movement of the valve means.

7. A spark timing control as in claim 5, the carburetor including a secondary induction passage and a throttle valve rotatably mounted therein to control flow therethrough, the throttle valve movement of claim 5 being the movement of the secondary throttle valve.

8. A spark timing control as in claim 5, including mechanical means connecting the throttle valve and valve means.

9. A spark timing control as in claim 5, including electrically operated means connected to the valve means for moving the same, and switch means operated in response to the movement of the throttle valve the predetermined amount for closing the switch means to energize the electrically operated means.

10. A spark timing control as in claim 9, the electrically operated means comprising a solenoid.

11. A spark timing control as in claim 1, the conduit means having a bypass passage in parallel flow relationship to the conduit means and containing a flow restricting means to at times control the change in pressure level at the servo means.

12. A spark timing control as in claim 11, the control means including a second conduit means connected to the vacuum reservoir at one end and at the other end to the first conduit means between the flow restriction means and the servo means, and a valve means normally biased to a first position connecting the spark port vacuum through the first conduit means and bypass passage to the servo means and disconnecting the servo means and the vacuum reservoir, and means rendered operative in response to a predetermined opening movement of the throttle valve to move the valve means to a second position blocking the first conduit means while connecting the bypass passage and vacuum reservoir to the servo means to advance the timing by application of the higher vacuum level in the reservoir to the servo means until the higher vacuum is decayed by bleed of higher pressure thereto from the spark port through the flow restricting means.

13. A spark timing control as in claim 12, including solenoid means energized to move the valve means in response to movement of the throttle valve beyond a predetermined open position.

14. A spark timing control as in claim 12, including passage means conecting the vacuum reservoir to intake manifold vacuum in the induction passage below the throttle valve.

15. A spark timing control as in claim 3, the valve means comprising a rotatable valve, the throttle valve having a lever fixed thereto and to the rotatable valve whereby a predetermined rotative movement of the throttle valve moves the rotatable valve to the alternate position.

16. A spark timing control as in claim 3, the throttle valve having a lever fixed thereto, and the valve means comprising a rotatable valve fixed to the lever for a progressive variable connection between said conduits upon rotative movement of the throttle valve.

17. A spark timing control as in claim 1, the control means including valve means including a valve body having a cylindrical hollow interior rotatably mounting an essentially triangularly shaped control valve therein, the valve having a through port intersected by a flow restricting passage, the valve body having a first outlet port connected to the servo means, a second outlet port connected to the first conduit means and to the spark port, and a third outlet port connected to the vacuum tank, the control valve being operatively fixed for rotation with the throttle valve so as to provide a progressive rotation thereof and so constructed and arranged whereby in an idle speed position of the throttle valve the control valve connects spark port vacuum to the servo means while blocking communication of reservoir vacuum to the servo means, and progressive movement of the throttle valve towards a wide open position progressively rotates the control valve to proportionally increase the connection of reservoir vacuum to the servo means while proportionally decreasing spark port pressure to the servo means except that spark port pressure communicated to the servo means through the flow restricting passage.

18. A spark timing control as in claim 17, including means connecting the vacuum reservoir to manifold vacuum in the induction passage below the closed position of the throttle valve.

19. A spark timing control as in claim 3, including manifold vacuum responsive means to move the valve means between alternate positions.

20. A spark timing control as in claim 3, including a second servo secured to the valve means and responsive to manifold vacuum changes for moving the valve means, and including spring means biasing the valve means to one position.

21. A spark timing control as in claim 12, the valve means being movable in response to intake manifold vacuum connected thereto to act thereon.

22. A spark timing control as in claim 1, the control means including a valve body having a spool valve slidably mounted therein, the spool valve having a pair of spaced lands controlling communication of pressure first between branches of the conduit means connected one to the spark port and another to the servo means and second between the other branch and a line to the vacuum reservoir, the valve body including a flow restricting passage connecting the spark port branch and the servo means in a parallel arrangement whereby movement of the spool valve to a first position to connect the reservoir line and servo means branch also slowly bleeds the reservoir vacuum to the spark port pressure in the one branch until the pressures are equalized.

23. A spark timing control as in claim 22, including a second servo connected to the spool valve, spring means biasing the spool valve to the first position, and passage means connecting manifold vacuum to the servo means to move the spool valve in a variable manner as a function of manifold vacuum changes to a second position connecting the one and other branches while blocking the reservoir vacuum line.

* * * * *